United States Patent [19]
Tomita

[11] 3,944,005
[45] Mar. 16, 1976

[54] SUSPENSION DEVICE FOR VEHICLES

[75] Inventor: Fujihiko Tomita, Shizuoka, Japan

[73] Assignee: Yamaha Hatsudoki Kabushiki Kaisha, Iwata, Japan

[22] Filed: Dec. 26, 1974

[21] Appl. No.: 536,393

[30] Foreign Application Priority Data
Dec. 28, 1973  Japan.................. 49-1955

[52] U.S. Cl.................. 180/5 R; 305/16
[51] Int. Cl.².................. B62D 27/02
[58] Field of Search.......... 180/5 R, 6 R, 9.2 R, 9.5, 180/9.54, 9.56; 305/16, 21, 22, 30, 31, 46–49

[56] References Cited
UNITED STATES PATENTS
3,719,242  3/1973  Duclo.................. 180/5 R
3,727,709  4/1973  Newman.................. 180/5 R

*Primary Examiner*—Philip Goodman
*Attorney, Agent, or Firm*—Berman, Aisenberg & Platt

[57] ABSTRACT

A suspension device for motor driven vehicles such as snowmobiles comprises a pair of slide rails which are resiliently suspended under the vehicle body to ensure engagement of the ground-engaging portion of a flexible endless track with the ground, the endless track being driven by a drive sprocket wheel journalled on the front portion of the vehicle body and stretched at its rear portion over rear idler wheels journalled on the rear portions of the slide rails. The resiliency of the suspension device is adjusted to prevent skidding of the rear portion of the endless track.

14 Claims, 7 Drawing Figures

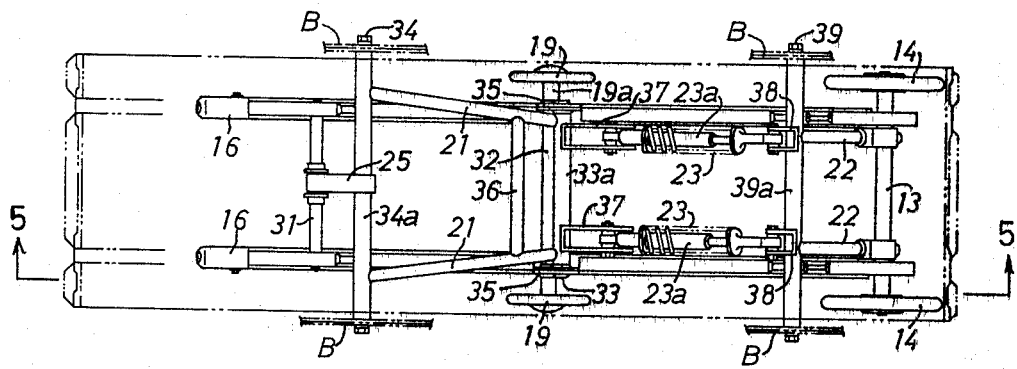
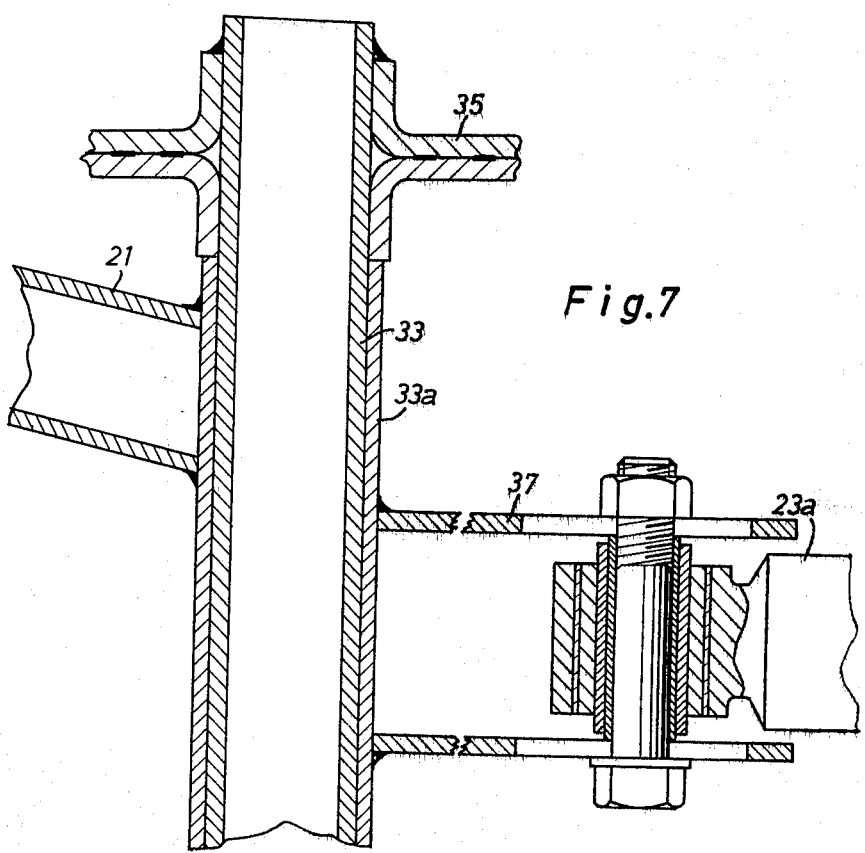

SUSPENSION DEVICE FOR VEHICLES

BACKGROUND OF THE INVENTION

The present invention relates to a suspension device for motor driven vehicles such as snowmobiles or tractors having an endless track driven by power taken from the vehicle engine by means of a sprocket wheel located on the front portion of the vehicle body, and more particularly to an improved suspension device of a type including a pair of slide rails which are resiliently suspended under the vehicle body to ensure good engagement of the lower or ground-touching face of the endless track with the ground and journal at the rear ends thereof a supporting shaft of idler wheels for the endless track located on the rear portion of the vehicle body.

SUMMARY OF THE INVENTION

The prime object of the present invention is to provide a suspension device for a snowmobile, wherein a pair of slide rails suspended under the body of the snowmobile are well prevented from skidding at the rear portion of an endless track when the snowmobile makes turns at various speeds under various road conditions.

Another object of the present invention is to provide a suspension device for a snowmobile, having the above-mentioned characteristics, wherein the suspension characteristics at the front portion of the endless track can easily be adjusted to maintain the pleasant and safe riding of the snowmobile under various road conditions.

BRIEF DESCRIPTION OF THE DRAWINGS

The novel features that are considered to be characteristic of the present invention are set forth with particularity in the appended claims. The invention, itself, however, both as to its construction and its mode of operation, together with additional objects and advantages thereof, will best be understood from the following description of specific embodiments when read in connection with the accompanying drawings, wherein like reference characters indicate like parts throughout the Figures.

In the drawings:

FIG. 6 is a plan view of the suspension device shown in FIG. 5, with the body portion broken away for convenience of illustration; and FIG. 7 is an enlarged cross-sectional view taken on line 7 — 7 of FIG. 5.

DESCRIPTION OF THE PREFERRED EMBODIMENTS

Figure 1:
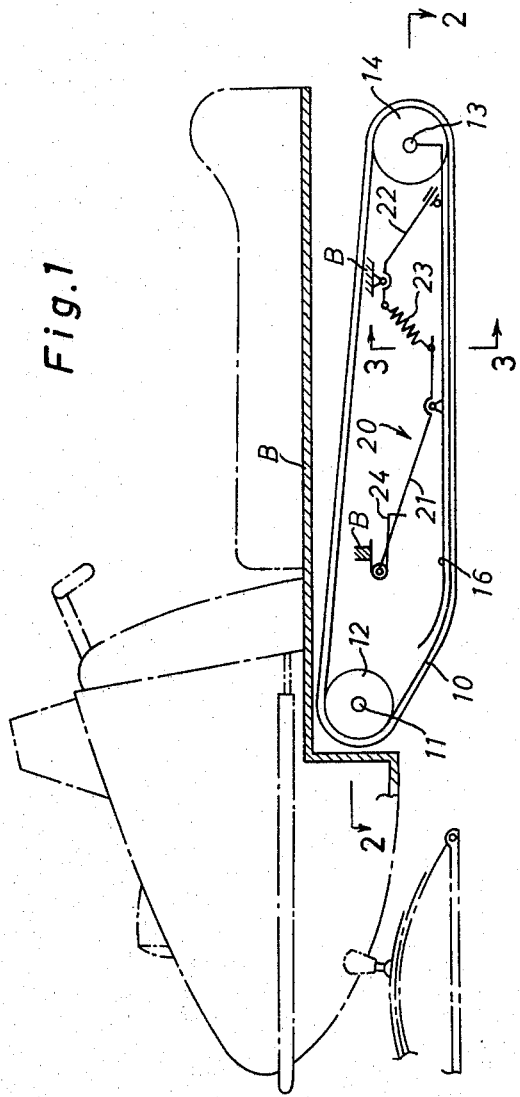
FIG. 1 is a schematic side view of a suspension device for a small snowmobile in accordance with the present invention.
Figure 2:
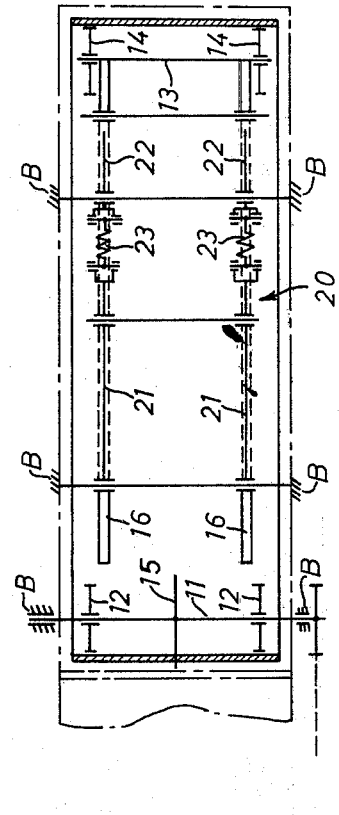
FIG. 2 is a cross-sectional plan view taken on line 2 — 2 of FIG. 1, with the body broken away for convenience of illustration.

Referring now to the drawings, particularly to FIGS. 1 and 2, an endless track 10 is stretched over a pair of front wheels 12, 12 located on the front portion of the vehicle body B and a pair of idler wheels 14, 14 located on the rear portion of the vehicle body B. The front wheels 12, 12 are secured on a drive shaft 11 journalled on the front portion of the vehicle body B and the rear idler wheels 14, 14 are secured on an idler shaft 13 journalled on the rear ends of a pair of slide rails 16, 16 which are provided longitudinally along the endless track 10. The drive shaft 11 is driven by the power taken from the vehicle engine by way of a drive sprocket wheel 15 secured at the center thereof. The slide rails 16, 16 are resiliently suspended under the vehicle body B by means of a suspension device 20 in accordance with the present invention.

Figure 3:
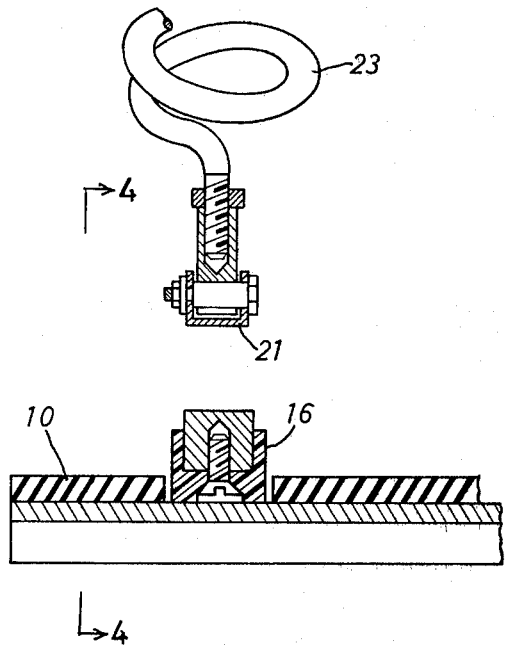
FIG. 3 is an enlarged vertical cross-sectional view taken on line 3 — 3 of FIG. 1.
Figure 4:
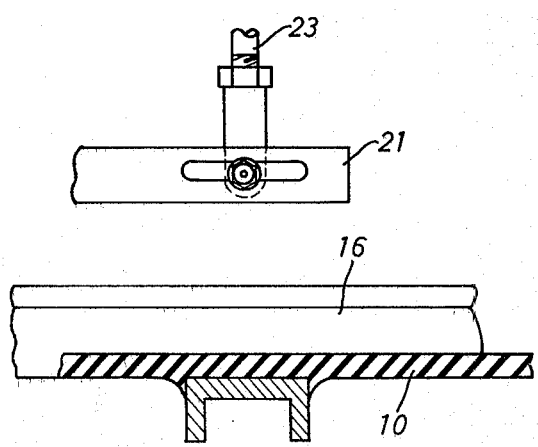
FIG. 4 is an enlarged side view taken from line 4 — 4 of FIG. 3.

The suspension device 20 comprises a pair of front arms 21, 21 journalled on the vehicle body B at the front ends thereof, a pair of rear arms 22, 22 swingably journalled on the vehicle body B, a pair of coiled springs 23, 23 interposed between the rear extensions of the front arms 21, 21 and the front extensions of the rear arms 22, 22 and a pair of torsion springs 24, 24 to normally bias the front arms 21, 21 downwardly. The slide rails 16, 16 are swingably connected to the intermediate portions of the front arms 21, 21 respectively at their substantial central portions. The slide rails 16, 16 are further connected swingably and telescopically to the rear ends of the rear arms 22, 22 at the rear portions thereof to prevent transverse movements of the rear portions of the slide rails 16. The swinging movements of the rear arms 22, 22 are restricted in the vertical direction. The coiled springs 23, 23 are to resiliently bias the front arms 21, 21 downwardly and forwardly and to bias the rear ends of the rear arms 22, 22 rearwardly and downwardly. Further referring to FIGS. 3 and 4, the coiled springs 23, 23 are forward-or-aft displaceably connected to the rear extensions of the front arms 21, 21 respectively at their lower ends and to the front extensions of the rear arms 22, 22 respectively at their upper ends thereby to adjust the biasing forces of the coiled springs 23, 23 respectively.

The operation of the above-constructed embodiment of the present invention is described hereinafter in detail. In the case to run the snowmobile under rough road conditions, the pleasant riding of the vehicle is secured by maintaining spring constant against pitching of the front ground-engaging portion of the endless track 10 to be lower than spring constant at the rear ground-engaging portion of the endless track 10. This is carried out by displacing forwardly the lower mounting positions of the coiled springs 23, 23 or by displacing rearwardly the swinging fulcrum of the front arms 21, 21. In this instance, the endless track 10 is well prevented from skidding at the rear portion thereof at turns of the snowmobile.

In high speed travelling of the snowmobile under regular road conditions, the lower mounting positions of the coiled springs 23, 23 are displaced rearwardly or the swinging fulcrum of the front arms 21, 21 are displaced forwardly to maintain the spring constant against pitching of the front ground-engaging portion of the endless track 10 to be higher than the spring constant at the rear ground-engaging portions of the endless track 10. This fully effects the driving power of the engine of the snowmobile for its high speed operation. In this instance, as in the case of the rough road running, the rear portions of the slide rails 16, 16 are well supported by the rear ends of the rear arms 22, 22 thereby to prevent the rear portion of the endless track 10 from skidding in high speed turns of the snowmobile.

In the above embodiment, the pair of coiled spring 23, 23 are adapted to give vertical urging force to the rear and front extensions respectively of the front and rear arms 21, 21 and 22, 22. These coil springs 23 may be assembled together with conventional oil dampers to ensure the pleasant riding of the snowmobile.

Figure 5:
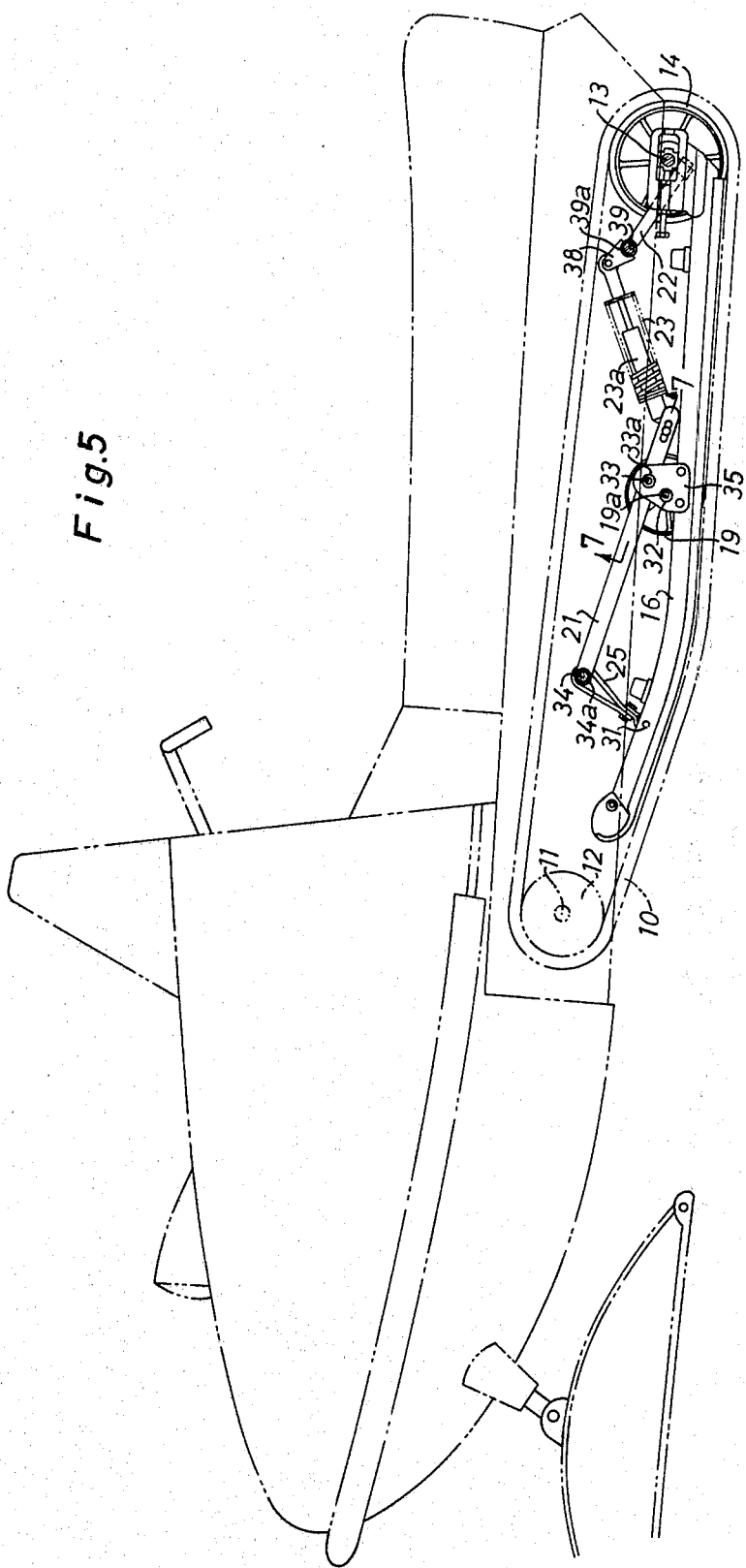
FIG. 5 is a vertical cross-sectional side view taken on line 5 — 5 of FIG. 6, showing an actual application of the suspension device in accordance with the present invention.

FIGS. 5 through 7 illustrate an actual application of the present invention, wherein the slide rails 16 and 16 are integrally connected in parallel to each other by way of transverse tubular connecting bars 31, 32 and a pivot shaft 33. The connecting tubular bar 31 is connected at its both ends with the front portions of the slide rails 16, 16 and connected also at its central portion by means of a connecting band 25 to an upper supporting shaft 34 journalled on the vehicle body B. The connecting tubular bar 32 and the pivot shaft 33 are integrally connected at the both ends thereof with the substantial central portions of the slide rails 16, 16 by way of a pair of brackets 35, 35 secured on the respective slide rails 16. The tubular bar 32 journalls a pair of bogie wheels 19, 19 through a shaft 19a provided therethrough.

In this application, the front arms 21, 21 are integrally connected to each other with a transverse tubular bar 36 and journalled at their both ends on the upper and lower supporting shafts 34 and 33 by way of tubular shafts 34a and 33a respectively. The rear extensions of the front arms 21, 21 are composed of a pair of U-shaped brackets 37, 37 secured on the tubular shaft 33a, and the front extensions of the rear arms 22, 22 are composed of a pair of U-shaped brackets 38, 38 secured on a transverse tubular shaft 39a which is journalled on a supporting shaft 39 mounted on the vehicle body B to support the rear arms 22, 22. The coiled springs 23, 23 are assembled together with respective oil dampers 23a, 23a which are respectively pivoted on the upper brackets 38 and the lower brackets 37 at the both ends thereof.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A suspension device for a motor driven snow vehicle having a flexible endless track driven by the power taken from the engine of the vehicle by way of a drive sprocket wheel journalled on the front portion of the vehicle body comprising:

slide rail means arranged longitudinally inside said endless track for holding engagement of the ground-engaging portion of said endless track with the ground and journalling rear idler wheels for said endless track at the rear end thereof, front supporting means journalled at the front portion thereof on the vehicle body and having a swingable connection at the rear portion thereof with an intermediate portion of said slide rail means to suspend said slide rail means under the vehicle body, said front supporting means having a rear extension projecting rearwardly of the axis of said swingable connection of the rear portion, rear supporting means having a journal connection on the vehicle body at the upper portion thereof and swingably connected at the lower portion thereof with the rear portion of said slide rail means to hold the rear portion of said slide rail means, said rear supporting means having a front extension projecting forwardly of the axis of said journal connection, and resilient means connected at the upper and lower ends thereof with said front and rear extensions respectively for biasing said slide rail means downwardly toward the ground by way of said front and rear supporting means to suspend said endless track and for preventing skidding of the rear portion of said endless track.

2. A suspension device for a motor driven snow vehicle as claimed in claim 1, wherein said resilient means is adjustably connected at its lower end to the rear extension of said front supporting means.

3. A suspension device for a motor driven snow vehicle as claimed in claim 1, wherein the connection between the lower end of said resilient means and the rear extension of said front supporting means is adjustable along the longitudinal direction of said slide rail means to adjust the biasing force toward said slide rail means whereby the adjustment of the biasing force of said resilient means acts to prevent skidding of the rear portion of said endless track.

4. A suspension device for a motor driven snow vehicle as claimed in claim 1, wherein the connection between the upper end of said resilient means and the front extension of said rear supporting means is adjustable along the longitudinal direction of said slide rail means to adjust the biasing force toward said slide rail means whereby the adjustment of the biasing force of said resilient means acts to prevent skidding of the rear portion of said endless track.

5. A suspension device for a motor driven snow vehicle as claimed in claim 1, wherein said resilient means comprises a pair of coiled springs interposed between the rear extension of said front supporting means and the front extension of said rear supporting means and wherein the connections of said respective coiled springs with the rear extension of said front supporting means and the front extension of said rear supporting means are adjustable along the longitudinal direction of said slide rail means respectively to adjust the biasing force toward said slide rail means, whereby the adjustment of the biasing force of said coiled springs acts to prevent skidding of the rear portion of said endless track.

6. A suspension device for a motor driven snow vehicle as claimed in claim 1, wherein said resilient means comprises at least one coiled spring interposed between the rear extension of said front supporting means and the front extension of said rear supporting means.

7. A suspension device for a motor driven snow vehicle as claimed in claim 6, wherein said coiled spring is assembled together with an oil damper.

8. A suspension device for a motor driven snow vehicle as claimed in claim 1, wherein said slide rail means comprises at least one slide rail member extending longitudinally inside said endless track, said slide rail member being swingably connected at its substantial central portion with said front supporting means and journalling at its rear portion said idler wheels.

9. A suspension device for a motor driven snow vehicle as claimed in claim 1, wherein said slide rail means comprises a pair of slide rail members swingably connected at their susbtantial central portions with said front supporting means and wherein said resilient means comprises a pair of resilient elements interposed between the rear extension of said front supporting means and the front extension of said rear supporting means.

10. A suspension device for a motor driven snow vehicle as claimed in claim 9, wherein the connections between the rear extension of said front supporting means and said respective resilient elements are adjustable in the forward and rearward directions along said respective slide rail members.

11. A suspension device for a motor driven snow vehicle as claimed in claim 10, wherein the connections between the front extension of said rear supporting means and said respective resilient elements are adjustable in the forward and rearward directions along said respective slide rail members.

12. A suspension device for a motor driven snow vehicle as claimed in claim 9, wherein said front supporting means comprises a pair of front arms swingably connected with the substantial central portions of said slide rail members respectively and journalled at their front ends on the vehicle body, said resilient elements being connected respectively with a pair of rear extensions of said front arms.

13. A suspension device for a motor driven snow vehicle as claimed in claim 12, wherein said rear supporting means comprises a pair of rear arms journalled on the vehicle body at the upper portions thereof and swingably telescopically connected at the lower ends thereof to the rear portions of said slide rail members respectively.

14. A suspension device for a motor driven snow vehicle as claimed in claim 13, wherein said resilient elements are composed of a pair of shock absorbers interposed between the rear extensions of said front arms and the front extensions of said rear arms respectively.

* * * * *